June 2, 1970            P. E. SEABORN            3,515,273
METHOD FOR DETECTING OBJECT IN TRANSLUCENT
SUBSTANCE AND DEVICE THEREFOR
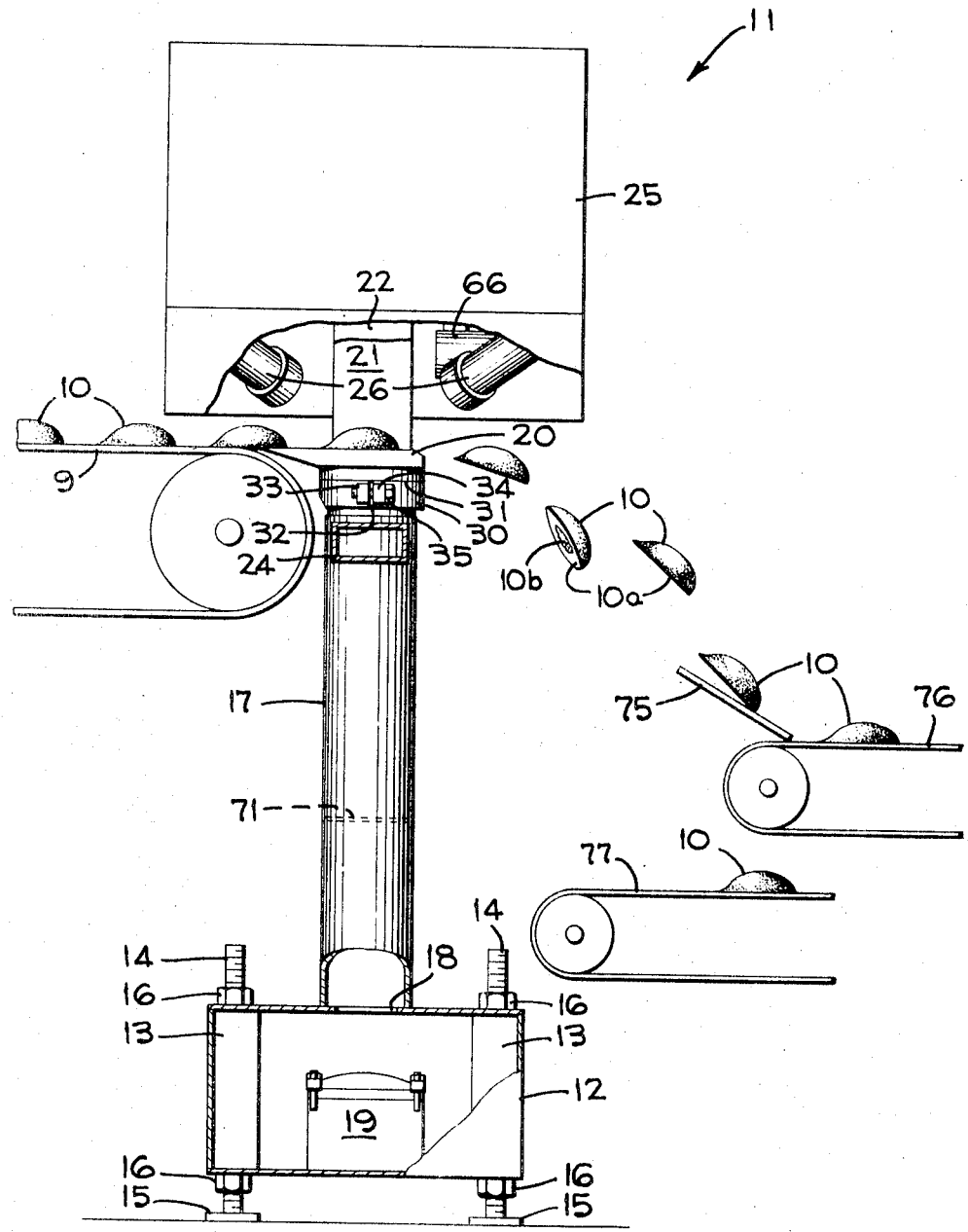
FIG_1
INVENTOR.
PAUL E. SEABORN

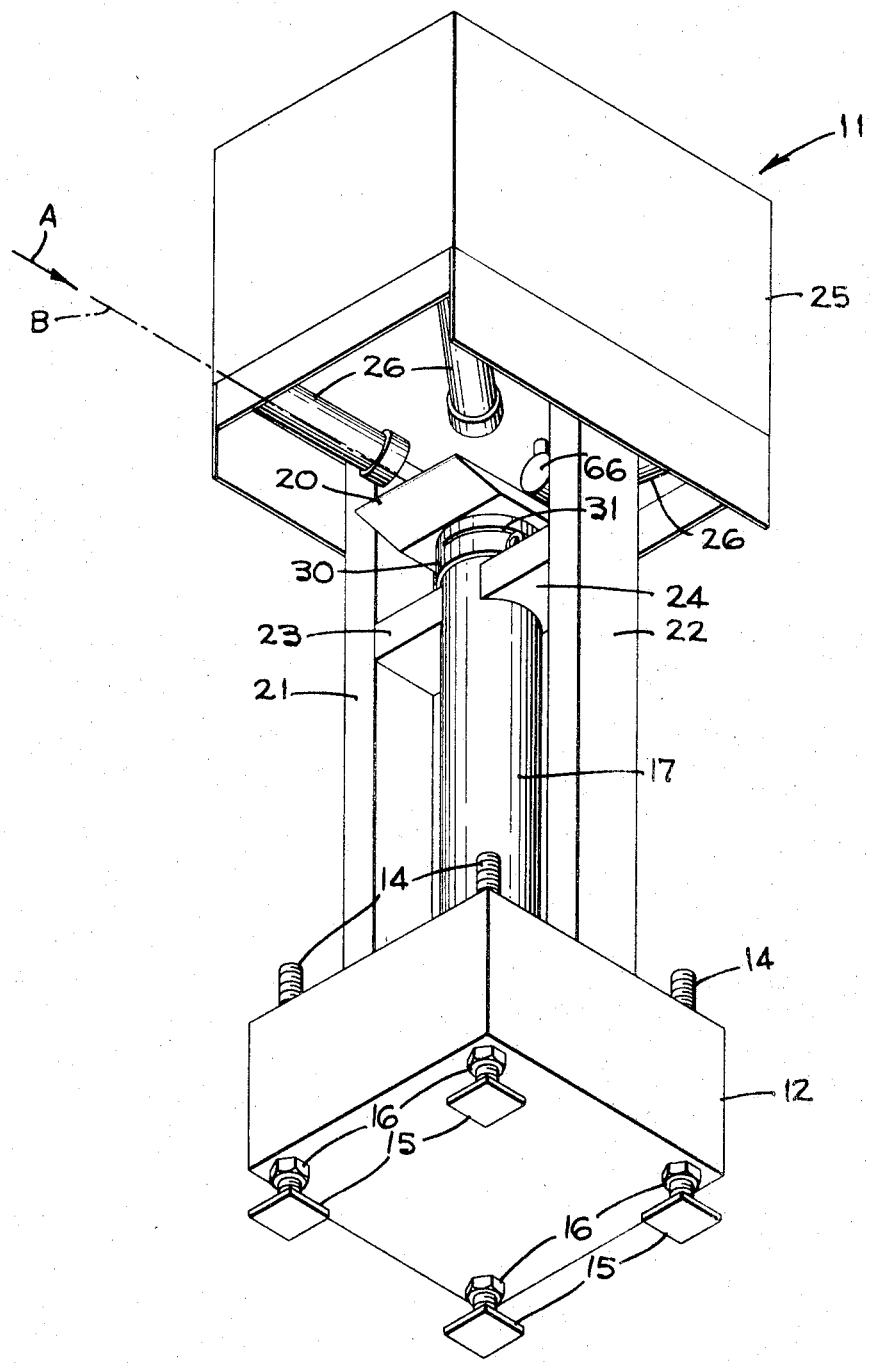

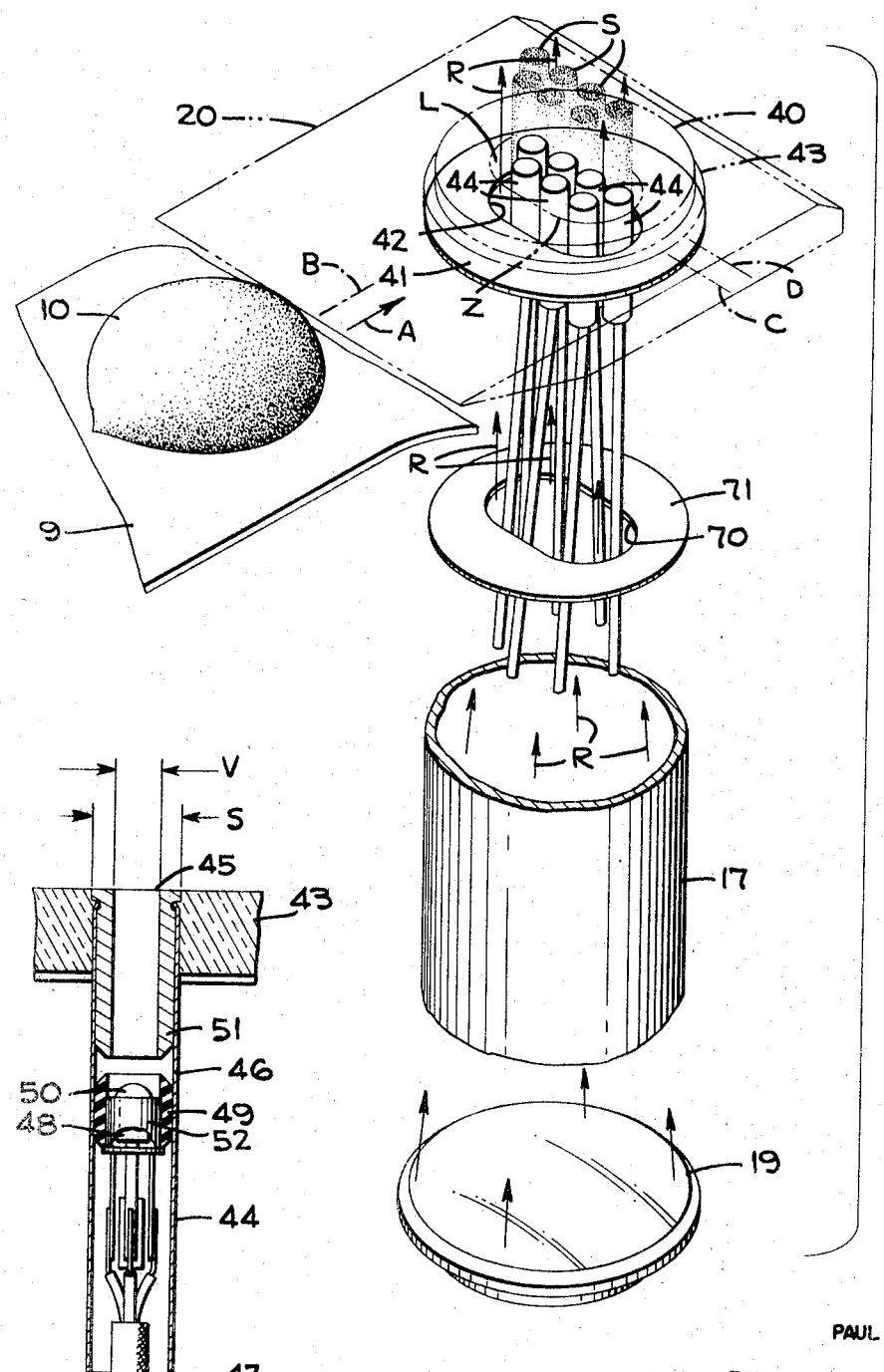

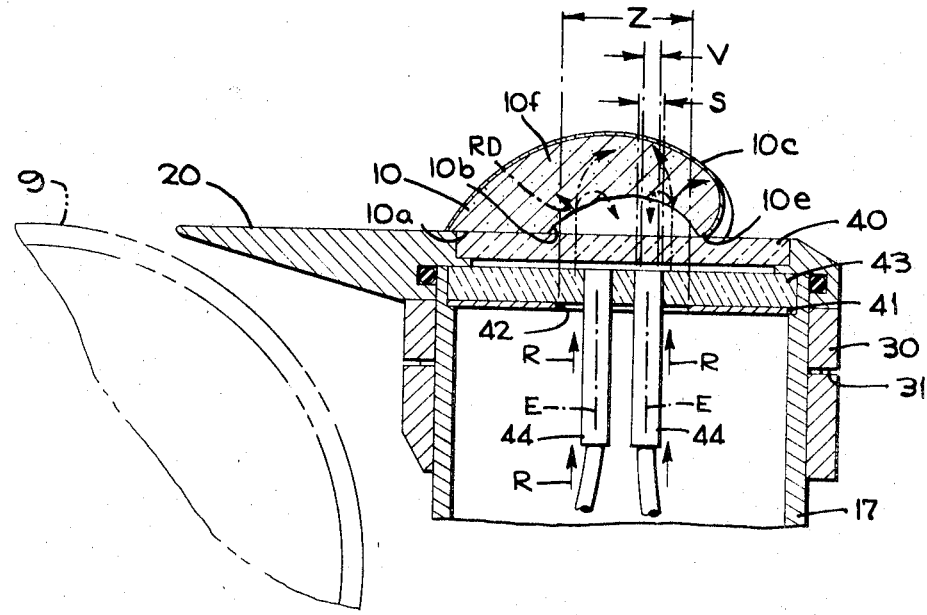
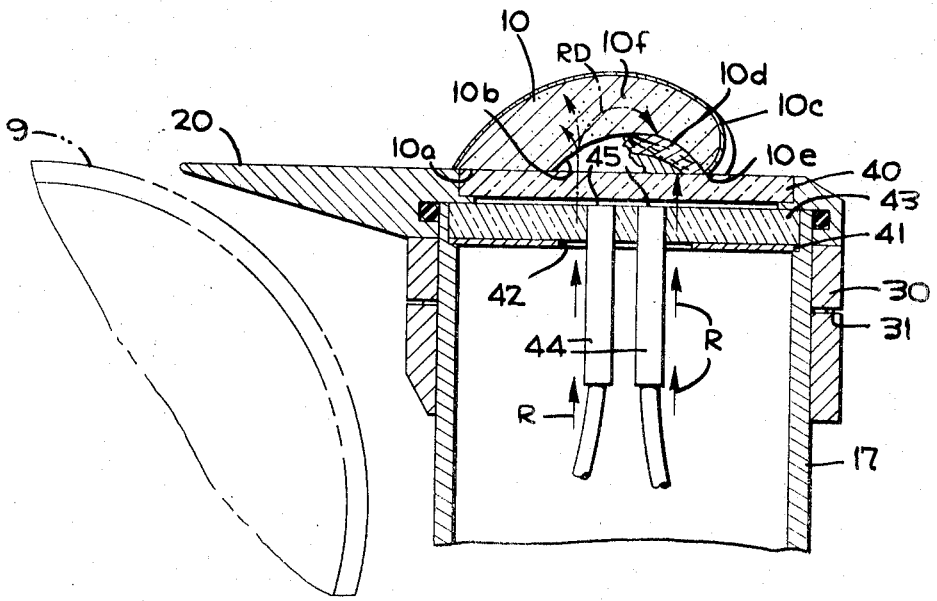

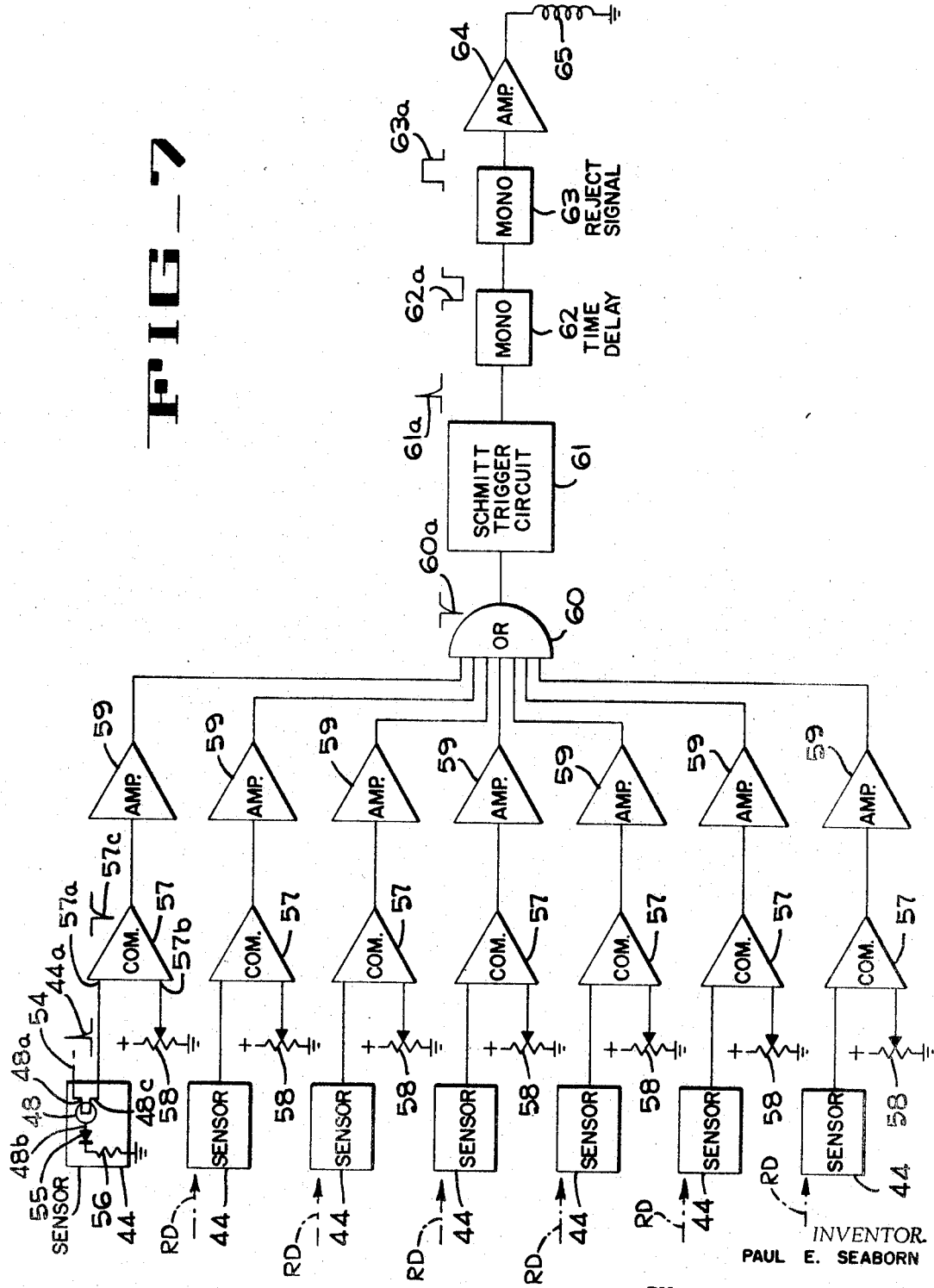

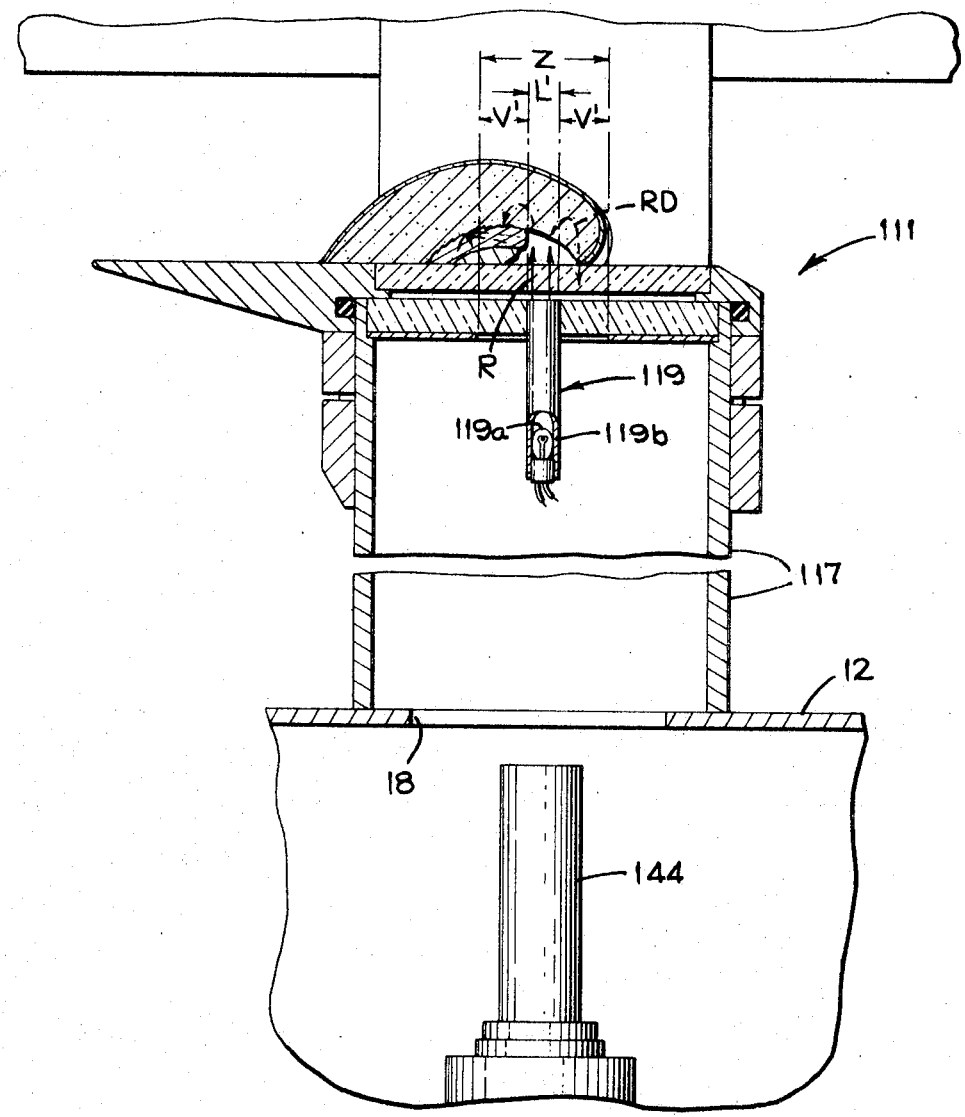
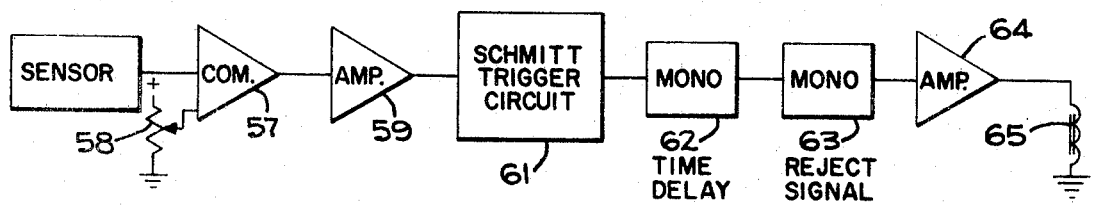

United States Patent Office 3,515,273
Patented June 2, 1970

3,515,273
METHOD FOR DETECTING OBJECT IN TRANSLUCENT SUBSTANCE AND DEVICE THEREFOR
Paul E. Seaborn, Los Gatos, Calif., assignor to FMC Corporation, San Jose, Calif., a corporation of Delaware
Filed Aug. 11, 1967, Ser. No. 659,906
Int. Cl. B07c 5/342; G01n 21/02
U.S. Cl. 209—111.7                                    24 Claims

ABSTRACT OF THE DISCLOSURE

A device for detecting pit fragments in peaches is positioned at the end of a delivery conveyor. The device has a window over which peaches travel, and a light source beneath the window directs approximately parallel rays of light toward the window. A light sensitive element in a tube is positioned with respect to the light source and the window to prevent the overlying portion of the peach from receiving the incident light rays and reflections directly. The tube is directed toward the window, and the element in the tube senses the level of diffused light in the overlying peach portion. With no pit present, the level of diffused light in the peach is above a predetermined level and no reject signal is produced. If light which diffuses through the peach is intercepted by a pit fragment, the sensor produces a signal which actuates an air blast to divert the peach with the fragment therein.

BACKGROUND OF THE INVENTION

The present invention relates to a detecting method and device particularly suited for detecting the presence of pits in pieces of fruit such as peach halves.

In a typical process of preparing peaches for canning, the peaches are cut in half and the pits are removed from the peach halves. Before canning, the peach halves are inspected to assure that no pit or pit fragment remains in the fruit. Frequently, this inspection occurs before the skin is removed from the fruit.

In the inspection of comestibles such as peach halves for the presence of a pit or pit fragment, it is known to provide a light source on one side of the peach half and a light sensitive sensor on the other side of the peach half. The amount of light passing through the peach from the source to the sensor is affected by the presence of a pit or pit fragment. If, because of a pit or pit fragment, the amount of light striking the sensor is below a predetermined level, a signal is produced which actuates mechanism to separate the detected peach half from peach halves free of pits or pit fragments.

In this typical known arrangement, the amount of light reaching the sensor is affected by factors other than the presence of a pit or pit fragment, and these factors can vary from peach to peach. For example, some peaches are greener and denser than others and there is a significant difference in the amount of light which can pass through a green peach as compared to a ripe peach Additionally, the peaches may be of different size, and less light will pass through a bigger peach than a smaller peach. Irregularities on the skin of the peach can also affect the amount of light passing through the peach half and reaching the sensor. Therefore, when a peach half without a pit or fragment therein is situated between a light source and a sensor, the lever of intensity of the light reaching the sensor can be low because of factors other than the presence of pit or fragment, and a signal to reject the peach can be given even though the peach may be suitable for canning.

SUMMARY OF THE INVENTION

In the method and device of the present invention, an inspection zone receives articles for inspection. A source of light casts rays on a portion of the inspection zone, another portion of the inspection zone constituting a viewing area which is not touched by these rays of light because of focusing or shielding or other means. A light sensitive sensor senses the level of light in the viewing area. When a translucent substance, such as a peach half, is in the inspection zone, a portion of the peach is in the path of the incident light rays which, in the absence of a pit or pit fragment in the peach half, are diffused throughout the peach half, including the portion of the peach half in the viewing area. When a pit, or pit fragment, in the viewing area is viewed by the sensor, there is a sharp contrast from the diffused light in the peach which is viewed when no pit or pit fragment is present. In the preferred embodiment of the present invention, the peach half, with cut surface down, is illuminated primarily from below. The light sensor is positioned between the source of light and the peach half so that the sensor shields a portion of the peach half from the light.

With this preferred arrangement, the possibility of a false signal being produced, when no pit or pit fragment is present, is significantly reduced. The diffused light seen by the sensor, when there is no pit or pit fragment, travels only a short distance through the peach flesh adjacent the pit where the flesh is usually ripest. No irregularity on the skin can produce a false signal because the light enters the peach half through the cut surface thereof. Moreover, the length of the path of diffused light through a small peach is substantially the same as the length of the path through a large peach so that different size peaches cannot significantly affect the light reaching the sensor to produce a false signal. Thus, the factors (other than the absence or presence of a pit or fragment), which in conventional detection mechanism can affect the level of light reaching the sensor, have less significance in the apparatus of the present invention. Consequently, with the arrangement of the present invention, the level of light seen by the sensor more reliably indicates the presence or absence of a pit or fragment in the fruit.

Low angle supplementary lights above the peach half may be provided to eliminate shadows at the margin of the peach which might otherwise appear to the sensor as pits or pit fragments.

It is therefore one object of the present invention to provide a method and device in which a sensor senses an opaque object in a translucent substance, the sensor being less likely to produce false signals. It is another object of the present invention to provide a method and device in which a sensor senses the presence of pits in fruit, the sensor detecting small fragments without producing false signals from other factors. It is yet another object of the present invention to provide a method and device in which a sensor senses the presence of a pit or pit fragment in peach halves in which the light enters the peach through the cut surface thereof and the peach is viewed through the same surface.

BRIEF DESCRIPTION OF THE DRAWINGS

FIG. 1 is a view in elevation showing the detecting mechanism of the present invention;

FIG. 2 is a view in perspective of the detecting mechanism shown in FIG. 1;

FIG. 3 is a schematic view in perspective, with parts broken away, of a portion of the detecting mechanism;

FIG. 4 is a view in cross-section of a part of the detecting mechanism sensing a peach half with no pit or pit fragment therein;

FIG. 5 is a view similar to FIG. 4 except that the peach has a pit fragment therein;

FIG. 6 is an enlarged view in cross-section of the sensing element and the mounting tube therefor; and FIG. 7 is a schematic diagram of a circuit to actuate the reject mechanism;

FIG. 8 is a view, partly in cross-section, of another embodiment of the present invention; and FIG. 9 is a schematic diagram of the electrical circuit for the device of FIG. 8.

DESCRIPTION OF THE PREFERRED EMBODIMENT

There is shown in FIG. 1 a conveyor 9 which carries drupes, such as peach halves 10, from a station (not shown), where pits are removed from the peaches, to a detecting apparatus, indicated generally at 11. The detecting apparatus scans the peaches leaving the conveyor 9 for pits or pit fragments.

As shown in FIG. 1, the detecting apparatus 11 has an enclosed base section 12 with four enlarged corner regions 13 through which four threaded rods 14 pass. The threaded rods terminate in pads 15 which rest on the floor, and the rods 14 can be vertically adjusted in the base by nuts 16 to assure level seating of the detecting apparatus on the floor at proper height. An upstanding hollow column 17, the inner wall of which is painted black, is mounted on the base over an opening 18 therein. A lamp 19, which is a spot lamp emitting approximately parallel rays, constitutes a light source mounted in the base directly beneath the opening 18. A shelf member 20 is mounted on the top of the column to receive the peach halves which are propelled off the end of the conveyor 9.

As shown best in FIG. 2, two upstanding frame members 21, 22 straddle the column 17 and are connected thereto by horizontal cross members 23, 24. The frame members 21, 22 support an electrical cabinet 25 at their upper ends which extends over the shelf member 20 in spaced relation thereto. The peach halves 10 move into the detecting apparatus 11 and onto the shelf member 20 thereof in the directional sense indicated by arrow A and along the path B. Four lamps 26 extend downwardly from the four corners of the bottom of the electrical cabinet to straddle the path B of the peach halves. The lamps are directed toward a peach directly over the column 17 and are inclined at an angle of approximately thirty degrees to the horizontal.

As shown best in FIGS. 1 and 2, the shelf member 20 has a depending skirt 30 which is received over the top of column 17. The skirt is slit horizontally at 31 (FIG. 1) and vertically at 32 to define two flexible fingers on the bottom of the skirt. Lugs 33 and 34 are secured, respectively, to the fingers and a screw 35 extends through the lugs. When the screw 35, which is threadedly engaged with lug 33, is drawn tight, the shelf member 20 is securely held on column 17.

As shown best in FIGS. 4 and 5, the shelf member 20 has a clear, transparent, circular quartz window 40 secured therein in horizontal orientation in the path B to receive the peach halves, cut surface 10a down, thereon. The upper end of column 17 receives a circular horizontal masking plate 41 with an oblong opening 42 therein. A clear transparent horizontally oriented plastic circular plate 43 is received in column 17 over plate 41 and in contact therewith. The upper surface of plate 43 is in closely spaced relation to the lower surface of window 40. Two rows of vertical light sensitive sensors 44 have their upper ends embedded in plate 43. The sensors 44 lie on parallel transverse lines C and D (FIG. 3) which extend perpendicularly to the path B of the peach halves. In line C there are three sensors 44, and in line D there are four sensors 44, the sensors in line D positioned in staggered relation to the sensors in line C. As shown in FIGS. 4 and 5, the upper ends of the sensors lie flush with the upper horizontal surface of the plate 43. The sensors are closely spaced but the lines C, D of sensors extend laterally equal distances on both sides of the path B of the peaches to be in registration with the pit cavity 10b of a peach half moving along path B with the cut surface down. Thus the open upper ends 45 (FIG. 6) of the sensors 44 are exposed, through the transparent window 40, to the peach pit cavity 10b as the peach half moves over the shelf member 20.

As shown in FIG. 6, the sensor 44 has an outer casing or tube 46, open at the upper end 45 and at the lower end 47. A light sensitive sensing element 48, which is a photosensitive transistor, is mounted in a casing 52 tightly received in sleeve 49. The casing 52, which has an opaque bottom and opaque side walls, has a light receiving lens 50 mounted therein facing upwardly to transmit to element 48 light passing through the upper open end 45 of sensor 44 and passing through sleeve 51. No light received in the lower end 47 of tube 46 can pass through the tube or reach the lens 50 because the bottom of casing 52 and sleeve 49 block all light entering the tube 46 from below.

The sensing element 48 of each sensor 44 may, for example, be a P-channel diffused silicon photosensitive field-effect transistor, Type P-102, of Siliconix Incorporated, Sunnyvale, Calif. The field-effect transistor, as shown in FIG. 7, has a drain 48a connected to a source of negative voltage 54, a gate 48b connected through a diode 55 and resister 56 to ground, and a source 48c connected to an input terminal 57a of a comparator circuit 57. The comparator circuit may be a high-speed, differential comparator, linear integrated circuit, such as Fairchild A710. An adjustable voltage source 58 is connected to another input 57b of circuit 57.

Each sensor 44 produces a positive voltage pulse 44a when a dark spot is seen. This pulse is compared in the comparator circuit 57 to the reference voltage produced by source 58, and if the sensor voltage is above the predetermined level of source 58, a negative voltage pulse 57c is produced by the comparator circuit. This negative pulse is amplified by amplifier 59 and supplied to an input terminal of OR circuit 60. Whenever a signal appears at any one of the seven input terminals of OR circuit 60, an output signal 60a is produced which is inverted and shaped in the Schmitt trigger circuit 61. The pulse output 61a of circuit 61 is fed to monostable circuit 62 which produces a pulse 62a of predetermined duration. The end of the pulse produced by circuit 62 initiates a pulse output 63a from monostable circuit 63 which also lasts for a predetermined time. The pulse from circuit 63 is amplified in amplifier 64 to energize solenoid 65. Solenoid 65 operates a pneumatic reject valve 66 (FIGS. 1 and 2) to release a blast of air of duration established by the duration of the pulse output 63a of circuit 63.

As shown best in FIG. 3, light from source 19 enters column 17 and passes through the oblong opening 70 in a masking plate 71 which is similar to masking plate 41. The incident light rays, indicated at R, pass through opening 42 in masking plate 41, through the plastic plate 43 and window 40 to an inspection zone Z (defined by openings 42 and 70) above window 40. It will be noted from FIGS. 3 and 4, that the sensors 44, which intercept the rays of light from source 19, shield discrete portions of the window and inspection zone Z from the light rays R. The shielded areas S tend to define shadows which, however, are masked by the overhead lamps 26 and the diffused light scattered throughout the peach flesh, which is a translucent substance. A pit or pit fragment, however, constitutes an opaque object which will intercept the light from the overhead lamps and the light diffused through the peach flesh so that shadows S are cast on the pit or pit fragment. The sensors 44, which have longitudinal axes E, are directed toward, and their viewing range V (FIG. 4) is generally limited to, the portions S of the scanning zone Z shielded from the light rays.

As the peach halves 10 leave the pit removing station, they are moved cut surface down on conveyor 9 toward the detecting device 11. At this time the peach halves have skins 10c (FIG. 4) which have not yet been removed. Although the peach halves have left the pit removing station, a few may have a pit, or pit fragment 10d (FIG. 5) therein. As the peach halves are propelled by the conveyor 9 onto shelf member 20, they slide along path B over the horizontal window 40.

The outer edge of the peach half where the skin 10c meets the window, particularly at the stem cavity 10e, produces a dark region which, to the sensor, might resemble a pit or pit fragment. In order to avoid the production by this dark region of a false signal which would actuate the reject mechanism, light from lamps 26 is directed toward the peach half at a low angle to eliminate the dark regions at the margin of the peach half.

As shown in FIG. 4, when the incident light rays, which are parallel to and adjacent the vertical sensors, pass through masking plate 41 and strike a peach half with no pit or fragment therein, the light rays are diffused through the flesh 10f of the peach in all directions as indicated by dotted lines RD. The total area S shielded from the light rays is smaller than a peach half 10, and whenever any portion of a peach half is in the viewing area V (which is smaller than and generally confined within the shielded areas S), another portion of the same peach will be in the portion L (FIG. 3) of the inspection zone Z illuminated directly by rays of light R. It will be noted that rays from the portion of the peach which is in the portion L of the inspection zone pass through the peach flesh into another portion of the peach (the portion viewed by the sensors) which is in the portion S of the inspection zone shielded from the direct rays of light. Thus, the peach flesh acts as a conduit to bring the diffused light rays into the viewing range V and direct this light toward the sensors. When no peach half is in the viewing area, the sensors sense the light from lamps 26 and the light from lamp 19 which is reflected from the bottom of cabinet 25.

The possibility of a false signal is minimized as can be seen from FIG. 4. Regardless of the size of the peach half, the diffused light detected by the sensors travels a short path through the flesh of the peach and, consequently, the density of the peach flesh will not materially alter the amount of light seen by the sensors. No light from the source 19 need pass through the peach skin, so irregularities in the skin cannot reduce the amount of light from that source reaching the sensor.

As shown in FIG. 5, when a pit fragment in a peach half moves into the viewing range V of one of the sensors, no light can reach that sensor either directly from source 19 (because the sensors viewing range V is primarily only that portion S of the scanning zone Z shielded from the direct rays of light) or indirectly through the peach flesh (because the opaque pit fragment is positioned between the sensor and the peach flesh). Thus, when there is no pit or pit fragment, the shadow cast by the sensors on the peach half is masked (that is, illuminated) by the light diffused through the peach flesh; when there is a pit or pit fragment between the flesh of the fruit and the sensor, the shadow of the sensor is seen by the sensor on the pit or pit fragment. It should be noted that light from lamps 26 above the peach half does not alter the effect of the light from source 19. When no pit or pit fragment is present in the peach half, the light from above merely augments the light seen by the sensor. When a pit or pit fragment is present in the peach, no light from the peach flesh, whether from source 19 or lamps 26, can penetrate the pit or pit fragment to enter the sensor tube.

If, because of the absence of light (which can occur only when a pit or pit fragment is seen by the sensors), the signal from any one sensor is greater than the reference signal from source 58 for that sensor, the signal will be amplified and transmitted through the OR gate 60, and trigger circuit 61, to monostable circuit 62 to initiate a pulse of predetermined length. During the time duration of the pulse from circuit 62, the peach half with the pit fragment, moves under inertia from over window 40 to a position under reject valve 66. The termination of the pulse from circuit 62 initiates the pulse from circuit 63, and hence initiates a downward blast of air from valve 66 which constitutes a reject mechanism to lower the trajectory of the rejected peach half and separate that piece of fruit from the unrejected peach halves. Unrejected peach halves fly over separator plate 75 and onto conveyor 76. Rejected peach halves fall under separator plate 75 onto conveyor 77.

The device 111 of FIG. 8 is identical to the device of FIG. 2 except as noted below. In lieu of the seven sensors embedded in plate 43, a single light source 119 is embedded therein. Light source 119 consists of a lamp 119a mounted in the bottom of a tube 119b. The base of the lamp closes the bottom of the tube so that all light from the lamp is directed upwardly, as indicated by arrows R, in substantially parallel rays into the illuminated portion L' of the inspection zone Z. A sensor, 144 which is a conventional photomultiplier tube, is mounted in the enclosed base section 12 directly under the opening 18. The column 117 is identical to column 17 except that the inner wall is painted white. When a peach half is in the inspection zone, the light rays diffused through the peach half, as indicated by dotted arrows RD, pass through a portion of the peach in the viewing area V' of the inspection zone which surrounds the illuminated area L' of the inspection zone. Thus, a pencil of light is focused on a portion of the peach half and this light is diffused through the peach half into a portion thereof which surrounds the portion illuminated by the direct rays of light from source 119. The sensor 144 senses only the light diffused through the peach half, and if a pit fragment is present therein, the fragment intercepts the diffused light to reduce the light reaching the sensor.

As shown in FIG. 9, the reject mechanism is operated in the same manner as described in conjunction with FIG. 7, except that in the mechanism of FIGS. 8 and 9, there is only one sensor in lieu of seven. The signal from sensor 144 is compared, or measured, in comparator circuit 57 and, if below a predetermined level established by source 58, a signal is amplified and transmitted, through trigger circuit 61, time delay circuit 62, reject signal circuit 63, and amplifier 64 to solenoid circuit 65 of reject mechanism 66.

It will thus be seen that a detecting mechanism for inspecting articles, such as pieces of fruit, is provided which is particularly effective to detect the presence of pits or fragments in peaches without numerous false signals. The mechanism utilizes the difference in properties of the translucent peach flesh, which scatters, or diffuses light, and the pit of pit fragment, which blocks, or intercepts, light. The light sensitive sensing element which senses the level of light in the fruit has been utilized in an arrangement in which factors other than the presence or absence of a pit or fragment have reduced significance in influencing the level of light in the fruit. Consequently, there is a marked difference in the level of light in the fruit depending on whether a pit or fragment is present or not. Thus, the number of false signals produced is significantly reduced.

Having completed a detailed description of the invention so that those skilled in the art could practice the same, I claim:

1. A device for inspecting a translucent substance for the presence of a relatively opaque object therein comprising a source of light to cast rays on a portion of said substance adjacent a viewing area without impinging on said viewing area, a light sensitive element on the same side of said substance as said source of light to sense the level of light diffused through said translucent substance in said viewing area, and means responsive to said element for producing a signal in accordance with the presence of a relatively opaque object in said viewing area.

2. A device for detecting pit fragments in open pitted fruit halves comprising a source of light to direct incident rays toward the open halves, a light sensitive sensor positioned between said source of light and the fruit half to intercept the incident rays of light directed at a portion of the fruit half, said sensor operable to sense the level of diffused light in said portion of the comestible.

3. The device of claim 2 including means responsive to the sensor to signal the presence of a pit fragment in the fruit half when the level of diffused light sensed by the sensor is below a predetermined level.

4. The device of claim 2 in which the light sensitive sensor comprises a tube and a light sensitive sensing element contained in the tube, said tube directed toward said portion of the fruit half.

5. A device for detecting a pit fragment in a translucent drupe comprising means defining a window, means to move the comestible past the window, a source of light to direct rays through the window, a sensor positioned between the source of light and the window to shield a portion of the window from said rays of light.

6. The device of claim 5 in which said sensor has a tube with a longitudinal axis directed toward the shielded portion of the window and has a light sensitive sensing element in said tube to sense the level of light diffused through the portion of a translucent comestible passing by the shielded portion of the window, the device having means responsive to the light sensitive sensing element to produce a signal when the diffused light in the portion of a translucent drupe passing by the shielded portion of the window drops below a predetermined level to indicate the presence of a pit fragment in the drupe.

7. The device of claim 6 including means responsive to said signal to separate the drupe causing said signal from the other drupes.

8. The mechanism of claim 7 including means responsive to said sensing element to produce a reject signal when the diffused light is intercepted by an object in the fruit.

9. A device for detecting pit fragments in drupe halves moving along a path through an inspection zone comprising a source of light to cast rays on the cut surfaces of the drupe halves as they move through the inspection zone, means to shield said light rays from a portion of said inspection zone, a plurality of light sensitive sensing elements arrayed in a line transverse to said path and positioned to receive light from said shielded portion of the inspection zone to sense the level of light diffused through the portion of a drupe passing through said shielded portion of the inspection zone.

10. The mechanism of claim 9 including means responsive to any one of said sensing elements to separate a peach half from the other peach halves when the diffused light in said peach half is intercepted by a pit fragment.

11. The mechanism of claim 10 including reject mechanism operable in response to operation of any one of said sensors when the light diffused into that portion of the fruit in the shielded portion of the inspection zone is below a predetermined level.

12. The mechanism of claim 11 including reject mechanism operable in response to operation of any one of said sensors when the light diffused through that portion of the peach half within viewing range of said one sensor is below a predetermined level because of the presence of a pit fragment in the peach half.

13. A device for detecting objects in pieces of fruit moving along a path past an inspection zone comprising a source of light to cast rays toward said inspection zone, a light sensitive sensor positioned between said source of light and the inspection zone to shield a portion of said inspection zone from said light rays, said shielded portion smaller than a piece of fruit, said sensor directed toward said shielded portion of the inspection zone to sense the level of light diffused through the portion of a piece of fruit passing through said shielded portion of the inspection zone.

14. A device for detecting pit fragments in peach halves moving along a path through an inspection zone comprising a source of light to cast incident rays toward said inspection zone, a plurality of light sensitive sensors arrayed in staggered relation in lines perpendicular to the direction of said path, said sensors positioned between said source of light and the inspection zone to shield a portion of said inspection zone from said incident light rays, said shielded portion smaller than a peach half, said sensors directed toward said shielded portion of the inspection zone to sense the level of light diffused through the portion of a peach half passing through said shielded portion of the inspection zone.

15. A device for detecting pit fragments in peach halves moving along a path through an inspection zone comprising a horizontal window in the viewing area to receive the peach halves cut surface down, a source of light under the window to cast rays upwardly toward the window, a plurality of light sensitive sensors positioned between said source of light and the window to shield a portion of the window from said light rays, said shielded portion smaller than a peach half, said sensors directed toward said shielded portion of the window to sense the level of light diffused through the portion of a peach half passing over said shielded portion of the window.

16. A device for detecting pit fragments in peach halves moving along a path over a window comprising a source of light under the window to cast incident rays upwardly toward the window, a plurality of tubes positioned between the source of light and the window, said tubes having longitudinal axes directed toward the window, each of said tubes having a light sensitive element therein to sense the light passing through a portion of said window, said tubes and elements shielding said portions of said window from the direct rays of incident light from said source.

17. The method of inspecting articles for objects therein by the use of diffused light emanating from the articles and at the same time avoiding giving inspection results based on specular light reflected from the articles comprising the steps of sensing from one side the light that emanates from the article in a viewing area, illuminating the article from the same side in a zone adjacent said viewing area for causing the emission of diffused light from said article in the viewing area, and simultaneously preventing any illumination of said viewing area which would cause specular reflection from the article in the viewing area to be sensed.

18. The method of inspecting fruit to detect pit fragments therein comprising the steps of halving and pitting said fruit, passing said pitted halves past a light sensitive sensor which faces the open flesh of the fruit to sense the light in a viewing area thereon, directing a beam of light onto the open flesh of the fruit only outside the viewing area, measuring the intensity of the light sensed, and rejecting fruit halves in which the light intensity measured is less than that transmitted by ripe fruit not having pit fragments therein.

19. The method of inspecting ripe fruit and detecting pit fragments therein comprising the steps of halving and pitting said ripe fruit, passing said pitted halves cut surface down through a viewing area over a glass plate, illuminating from below only the portion of said cut surface surrounding the viewing area, sensing from below the light emanating from said cut surface only in the viewing area, and producing a signal in accordance with the intensity of the light sensed to distinguish fruit halves having pit fragments therein from other fruit halves.

20. A device for inspecting halved and pitted fruit and detecting pit fragments remaining in the halves thereof comprising means for directing said halves along a path through a viewing area with the open flesh of the cut surface of each half facing a predetermined direction, means for illuminating from said predetermined direction only the portion of the open flesh of the cut surface of each half surrounding said viewing area, means for sensing from said predetermined direction the light emanating from only the portion of said fruit in the viewing area, and means responsive to said sensing means for producing a signal to indicate the presence of a pit fragment in said pit cavity.

21. A device for inspecting pitted fruit halves moving through a viewing area with the cut surfaces facing a predetermined direction comprising a light source to illuminate from said predetermined direction only a portion of the fruit lying outside the viewing area, a sensor to sense from said predetermined direction only the portion of the fruit lying in the viewing area, and means responsive to said sensor to produce a signal when the level of light indicates the presence of a pit fragment in the fruit in the viewing area.

22. The device of claim 21 in which the portion of a fruit half in the viewing area surrounds the illuminated portion of the fruit half.

23. The device of claim 21 in which the portion of a fruit half in the viewing area is surrounded by the illuminated portion of the fruit half.

24. The method of inspecting translucent articles for opaque objects therein by the use of diffused light emanating from the articles comprising the steps of illuminating the article from one side thereof to cause the emission of diffused light from the article in a viewing area without illuminating said one side of said article in said viewing area with incident light, sensing from the same side of the object the diffused light that emanates from the article in the viewing area, and separating the articles in accordance with the level of light sensed in the viewing area.

References Cited

UNITED STATES PATENTS

| | | | |
|---|---|---|---|
| 2,881,919 | 4/1959 | Bartlett | 209—111.6 |
| 2,987,182 | 6/1961 | Ator | 209—111.6 |
| 3,005,550 | 10/1961 | Flanders | 209—111.6 |
| 3,381,819 | 5/1968 | Crawford | 209—111.7 X |
| 3,393,800 | 7/1968 | Durand | 209—111.7 |

RICHARD A. SCHACHER, Primary Examiner

U.S. Cl. X.R.
250—223; 356—210